US005723995A

United States Patent [19]
Mozdzen et al.

[11] Patent Number: 5,723,995
[45] Date of Patent: Mar. 3, 1998

[54] METHOD FOR ELIMINATING PROCESS VARIATION TIMING SKEWS IN A SOURCE SYNCHRONOUS DESIGN

[75] Inventors: Thomas J. Mozdzen, Gilbert, Ariz.; Harry Muljono, San Jose, Calif.

[73] Assignee: Intel Corporation, Santa Clara, Calif.

[21] Appl. No.: 575,970

[22] Filed: Dec. 20, 1995

[51] Int. Cl.$^6$ ............................................. H03K 5/13
[52] U.S. Cl. ........................... 327/293; 327/295; 327/141
[58] Field of Search ............................. 327/291, 292–295, 327/141

[56] References Cited

U.S. PATENT DOCUMENTS

| | | | |
|---|---|---|---|
| 4,482,826 | 11/1984 | Ems et al. | 307/602 |
| 4,615,005 | 9/1986 | Maejima et al. | 364/200 |
| 4,816,700 | 3/1989 | Imel | 307/269 |
| 5,015,872 | 5/1991 | Rein | 307/269 |
| 5,164,619 | 11/1992 | Luebs | 327/141 |
| 5,259,006 | 11/1993 | Price et al. | 327/141 |
| 5,345,109 | 9/1994 | Mehta | 327/115 |
| 5,444,405 | 8/1995 | Truong et al. | 327/293 |
| 5,486,783 | 1/1996 | Baumert et al. | 327/147 |
| 5,576,652 | 11/1996 | Boehlke | 327/254 |

*Primary Examiner*—Timothy P. Callahan
*Assistant Examiner*—T. T. Lam
*Attorney, Agent, or Firm*—Blakely, Sokoloff, Taylor & Zafman

[57] ABSTRACT

A source synchronous computer system to ensure the capturing of signals transmitted from a first component to a second component. An integrated circuit operating on a core clock signal and an I/O clock signal, the integrated circuit comprising a plurality of data drivers and a plurality of external I/O clock generators, wherein the external I/O clock generators generate external I/O clocks signals using circuitry identical to the data drivers except for a slight increase in the channel length of the pre-driver and driver transistors. These transistors control the transition time of the external I/O clock output node. By outputting data signals in the I/O clock domain and using the external I/O clock signals to synchronize transmission with external components, the integrated circuit ensures that the data signals transition before the transitions of the external I/O clock signals regardless of process induced signal variations. A set of data signals and a delayed I/O clock are generated from similar drivers to further ensure that the data signals are asserted before the transition of the external I/O clock signal.

6 Claims, 6 Drawing Sheets

METHOD FOR ELIMINATING PROCESS VARIATION TIMING SKEWS IN A SOURCE SYNCHRONOUS DESIGN

FIELD OF THE INVENTION

The present invention generally relates to reducing the output to output timing skews in a source synchronous design and more particularly to ensure that the transistor fabrication process does not result in output driving transistors with variable drive strengths, wherein the data outputs of a first component are asserted after the synchronizing clock signal output of the first component is asserted.

BACKGROUND OF THE INVENTION

External clock chips are often used to synchronize the timing between communicating chipsets. The external clock chip generates a system clock that is routed throughout the circuit board to different components for translation into an internal clock. The internal clock is then used by the individual components to generate internal and external signals. The extended routing of the system clock combined with the translation of the system clock to an internal clock by individual components results in timing variations at the interface of the different components. For systems operating at a low frequency most variations in timing interfaces are absorbed by the longer system clock cycle and any extreme timing variations are bypassed through the use of wait states added to the actual valid time of a signal. As microprocessor operating frequencies are improved system clock speeds must increase to fully utilize the benefits of a faster microprocessor, thus reducing the period of the system clock cycle and requiring additional use of wait states. This approach of adding wait states for a faster system clock imposes a relative performance penalty, especially in view of the fact that the microprocessor while operating at a higher frequency can remain idle during these wait states.

Source synchronous designs have been utilized to reduce the variation in timing interface between components. Source synchronous designs require the sharing of an input/output (I/O) clock between components that communicate frequently, thus reducing timing variations and limiting the addition of wait states. One drawback of such designs, however, is that the fabrication process of transistors can result in transistors with variable channel lengths leading to output data signals and I/O clock synchronization signals with variable valid assertions. Fluctuations in the valid assertions result in timing skews and the incorrect capture of data by the receiving component.

FIG. 1 shows a prior art shared clock system. CLOCK CHIP 130 is an external clock chip circuit generating system clock signals CLOCKIN 1 and CLOCKIN 2 for use by different components. Although this illustration shows CLOCK CHIP 130 coupled between a microprocessor, CPU 160, and EXTERNAL CHIPSET 170; typical shared clock systems have CLOCK CHIP 130 coupled to a large number of components. CPU 160 comprises an input CLOCKIN 1 coupled to PLL 100 and a bi-directional bus, DATABUS 3, coupled to I/O LOGIC 120. The CLOCKIN 1 signal is an output of the external CLOCK CHIP 130 and is used by CPU 160 to generate the internal clock I/O CLOCK 1 through the use of phase lock loop (PLL) circuitry. PLL 100. PLL 100 also generates PROCESSOR CLOCK which is routed throughout CPU 160 for use by CORE LOGIC 110. PROCESSOR CLOCK generally operates at a higher frequency than I/O CLOCK 1 because CORE LOGIC 110 does not have to communicate directly with EXTERNAL CHIPSET 170. Instead, CORE LOGIC 110 communicates to EXTERNAL CHIPSET 170 through I/O LOGIC 120. Similarly, CPU 160 can use I/O LOGIC 120 to communicate with other external components.

EXTERNAL CHIPSET 170 is typically an off chip component, such as a secondary level cache (L2 cache), that communicates with CPU 160 through the use of bus DATABUS 3. Communication along DATABUS 3 is synchronized through the use of internal clock I/O CLOCK 2 and I/O CLOCK 1. I/O CLOCK 2 is generated by PLL 140 for use in I/O LOGIC 150's latching circuitry. The use of different clocks, I/O CLOCK 1 to output signals along DATABUS 3, via I/O LOGIC 120, and I/O CLOCK 2 to receive signals from DATABUS 3, via I/O LOGIC 150, leads to a timing variation between CPU 160 and EXTERNAL CHIPSET 170.

As the speed of next-generation microprocessor designs improves, shared clock systems have great difficulty synchronizing the high speed data transmission rates required by these next generation designs. For example, the use of a shared clock system between a microprocessor operating at a frequency of 120 megahertz (MHz) and a system clock operating at a frequency of 60 MHz may lead to a two cycle processor delay during the subsequent transmission of data to an external component. To improve the 60 MHz operating frequency of the system clock the timing variations created by the routing of external system clocks and the generation of multiple internal clocks would have to be reduced. Although efforts to reduce these timing variations has lead to innovative system designs, the typical system clock does not operate at a frequency comparable to the microprocessor.

To circumvent the timing variations associated with shared clock system designs a source synchronous design is utilized, wherein a microprocessor shares its internal input/output (I/O) clock signal with another component. Because the sharing of an internal I/O clock among different components reduces this timing variation and increases the data transmission speed, it may be desirable to have a source synchronous clocking scheme wherein the synchronizing input/output clock signal is asserted after the output data regardless of the variable channel lengths created during the fabrication process.

SUMMARY OF THE INVENTION

A processor is described for use in a source synchronous design which utilizes identical output buffer structures to generate the data outputs and the synchronizing input/output (I/O) clock signals. Although the output buffers use the same logic circuitry, the transistor length of the driver and pre-driver transistors used to generate the I/O clock signals are created using a different mask layer width than the driver and pre-driver transistors of the data outputs. The wider mask creates a longer channel length between the source and drain region of the I/O clock signal driver and pre-driver transistors. Thus, during the fabrication process anomalies, such as heat created lateral diffusion, that randomly reduce transistor channel length will not result in a smaller channel length for the driver and pre-driver transistors of an I/O clock signal than the driver and pre-driver transistors of a data output signal.

In one embodiment, the I/O signals are generated by I/O clock generators which are coupled to a plurality of DATABUS drivers. A first I/O clock generator generates a first I/O clock signal. The first I/O clock signal is used by a receiver component to synchronize latches used to capture the first set of outputs from the first set of databus drivers. Dispersing the I/O clock generators among a group of databus drivers and creating a longer channel length for the driver and pre-driver transistors used to generate the I/O clock signals than the data output signals ensures that the I/O clock signals do not generate a synchronizing clock edge before the outputted data is asserted.

BRIEF DESCRIPTION OF THE DRAWINGS

The present invention is illustrated by way of example and not limitation in the figures of the accompanying drawing, in which like references indicate similar elements, and in which.

DETAILED DESCRIPTION

A source synchronous clocking scheme is described that utilizes logically identical output buffer structures to generate clock signals and data output signals. The only physical difference in the buffer structures is found in the driver and pre-driver transistors of the I/O clock output buffers wherein a different mask geometry is used to create a slightly longer channel length. The longer channel length ensures that process variations do not create an effective channel length ($L_{eff}$) wherein the $L_{eff}$ of the I/O clock buffers is less than the $L_{eff}$ of the output buffers. The larger $L_{eff}$ for the I/O clock buffers results in a slower transition time for the I/O clock signals than the data signals during the charging/discharging of identical capacitance. This is shown by the following well-known equations that govern the charge/discharge currents of metal-oxide-semiconductors (MOS):

$$I_{ds} = \frac{KW}{L_{eff}} [(V_{gs} - V_t)V_{ds} - V_{ds}^2] \text{ linear region current}$$

$$I_{ds} = \frac{KW}{L_{eff}} (V_{gs} - V_t)^2 \text{ saturation region current}$$

$I_{ds}$ = drain to source current    $W$ = channel width $L_{eff}$ = effective channel length    $V_{gs}$ = gate to source voltage $V_t$ = threshold voltage    $K$ = constant Because the drain to source current ($I_{ds}$) of the I/O clock buffer is less than the $I_{ds}$ current of the output data buffers the data signals are valid before the clocking signal.

Figure 7A:
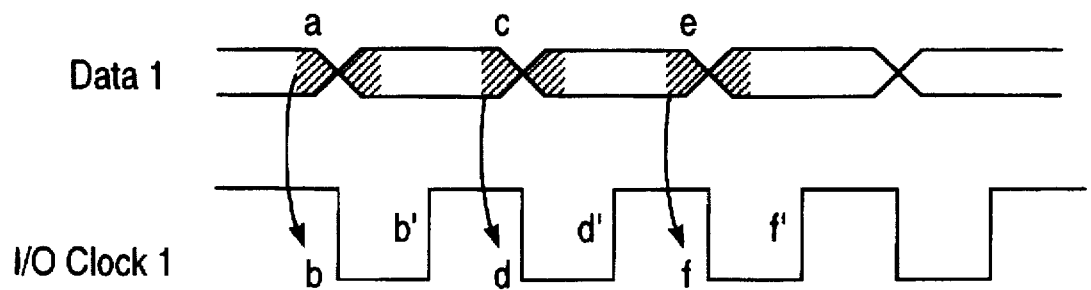
FIGS. 7(a)-(c) is an illustration of timing diagrams showing the effect of process variations on the data and I/O clocking signals.

FIG. 7 illustrates variations between data signals and I/O clocking signals caused by variations in the $L_{eff}$. It should be noted that the hashed regions of the Data clocking signals illustrated in FIG. 7 depict regions where the data is unstable and the unhashed regions depict where the data is more stable. In FIG. 7(a) no process variation exists, thus the transition points A to B, C to D, and E to F occur simultaneously. In this clocking scheme the clock signals are exactly synchronized with the data signals. The rising edge of the I/O clock will cause the receiver to latch the data at the most stable point. The latching I/O clock transitions B', D' and F' occur while the data is most stable.

Figure 7B:
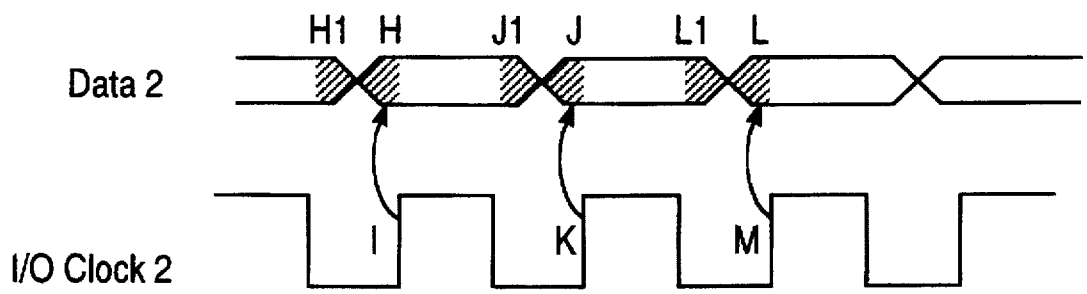

FIG. 7(b) illustrates a clocking scheme wherein the mask layers used to create the clock buffers and the data output buffers are identical, but the transistor fabrication process has reduced the $L_{eff}$ of the I/O clock output buffers leading to a stronger drain to source current for the output clock buffer drivers. Thus, the I/O CLOCK 2 signal generates synchronizing edges before DATA 2 is valid. As shown in FIG. 7(b) the early transition of I/O CLOCK 2 at points I, K, and M can lead to the possible latching of invalid data along the points H1 to H, J1 to J, and L1 to L by a receiving component that utilizes I/O CLOCK 2 for synchronization of output DATA 2.

Figure 7C:
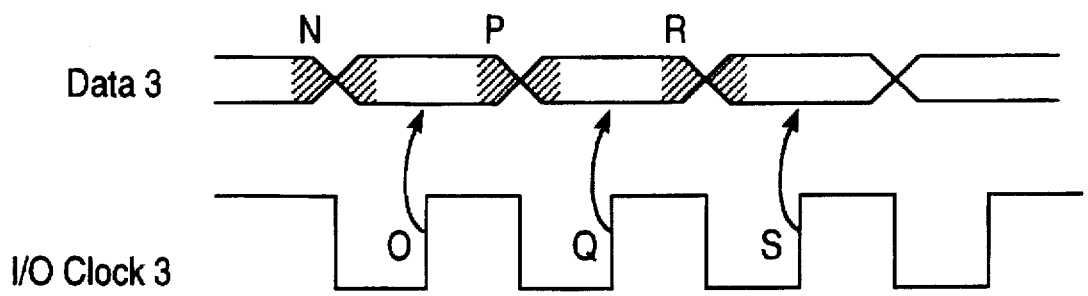

Although the same process variation is assumed for FIG. 7(c), the use of a wider mask layer width to form the output buffers of the I/O driver transistors leads to an I/O CLOCK 3 signal that has transition points after DATA 3 is valid. Thus, the process induced reduction of $L_{eff}$ does not reduce the $L_{eff}$ of the I/O clock output buffer transistors below the $L_{eff}$ of the unchanged data output buffers. As shown in FIG. 7(c) the I/O CLOCK 3 generates synchronization edges at points O, Q, and S that are asserted after the DATA 3 has changed at points N, P, and R. Thus, the wider mask layer ensures that the drain to source current of the I/O clock output buffer transistors is less than the drain to source current of the output data buffers regardless of process variation affecting the $L_{eff}$ leading to an I/O CLOCK 3 signal that has clocking edges subsequent to data transitions.

Although the effect of process variations changing the I/O CLOCK speed can be compensated for through the use of delay elements, for example an inverter chain, such designs lead to a system wherein the transmitting I/O clock is significantly delayed. In source synchronous design systems, wherein high frequency transmissions are desired, the I/O clock used by the transmitting component should closely match the I/O clock used by the latching component, thus making the use of delay elements impractical.

While diagrams representing certain embodiments of the present invention are illustrated in FIGS. 2, 3, 4, 5, and 6 these illustrations are not intended to limit the invention. The specific circuits described herein are only meant to help clarify one's understanding of the present invention and to illustrate particular embodiments in which the present invention may be implemented. It will be appreciated that the broader spirit and scope of the present invention, as set forth in the appended claims, may be applied to any type of circuit which seeks the performance achievements attained by the present invention.

Figure 1:
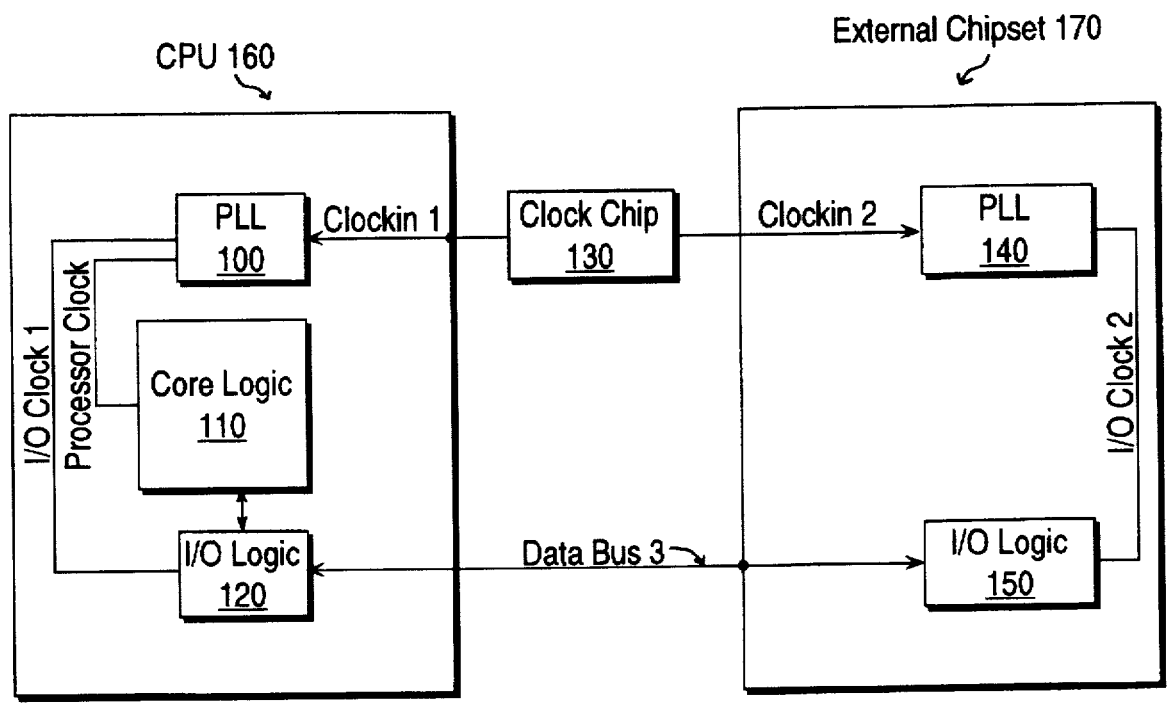
FIG. 1 is an illustration of a prior art implementation of a shared clock system.
Figure 2:
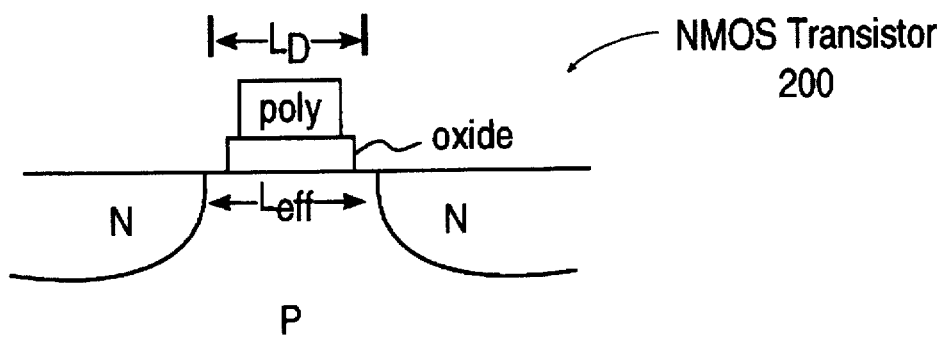
FIG. 2 is an illustration of an NMOS transistor unaffected by lateral diffusion of the n-type region.
Figure 3:
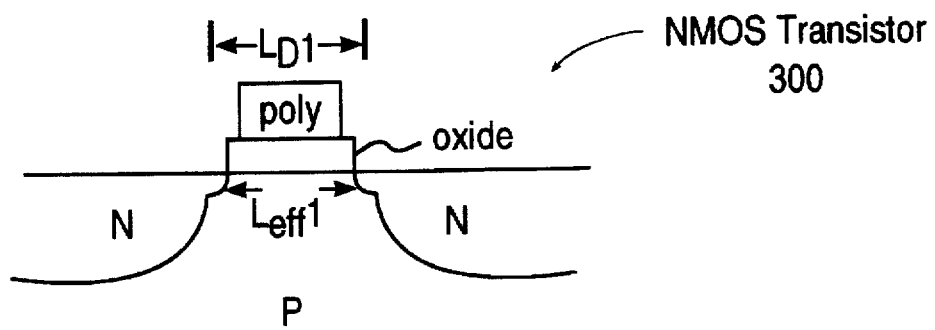
FIG. 3 is an illustration of an NMOS transistor with a channel length of $L_{D1}$ and a lateral diffusion of the n-type region resulting in an effective channel length of $L_{eff1}$.

FIG. 2 shows NMOS TRANSISTOR 200 unaffected by lateral diffusion during the fabrication process. The drawn channel length ($L_D$) of the mask layer is equal to the effective channel length ($L_{eff}$) after fabrication. Such a direct correspondence between the mask width and the actual fabricated transistor is difficult to achieve in present designs and typically a slight variation between the mask layer width and the actual channel length exists. FIG. 3 shows a NMOS TRANSISTOR 300 with a reduced channel length of $L_{eff1}$. Unlike FIG. 2, the drawn channel length ($L_D1$) of the mask layer used to create TRANSISTOR 300 is not the actual channel length of the transistor because of the lateral diffusion of the N-type impurities. Lateral diffusion of P-type impurities also exists for PMOS transistors.

The use of lateral diffusion to speed up circuits is well known in the prior art. However, the prior art utilized lateral diffusion (i.e. speed up) to increase signal propagation within a given component. During the synchronized transmission of signals between two components, process induced variable signal speeds lead to timing skews. These timing skews are especially relevant in high frequency systems wherein the variable signal speeds can not be accounted for by adding a delay to the synchronizing clock signals. Thus, it would be desirable to have MOS transistors wherein process induced variations of the $L_{\mathit{eff}}$ do not create an I/O clock signal that transitions faster than a data output signal created from a logically equivalent circuit.

Figure 4A:
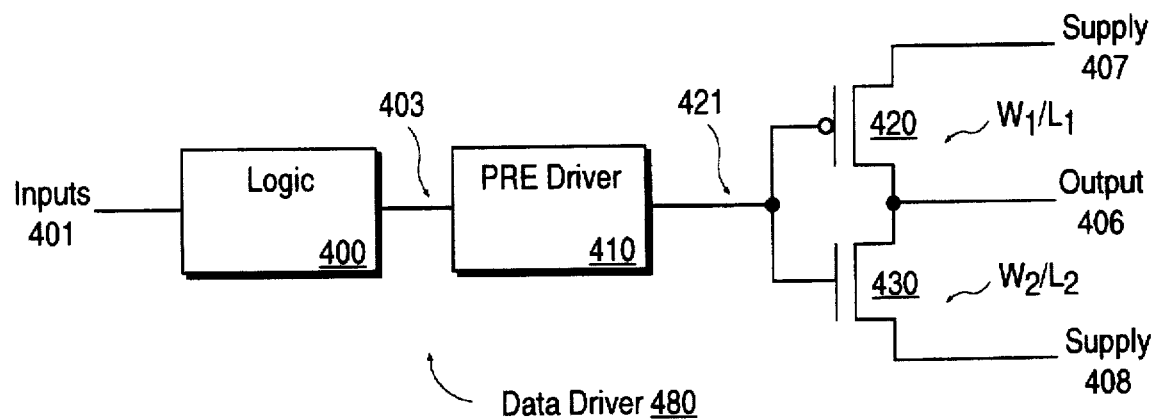
FIG. 4a is an illustration of a data output driver with a pre-driver and a final driving stage.

FIG. 4(a) shows DATA DRIVER 480 according to one embodiment. LOGIC 400 is used to process INPUTS 401 of DATA DRIVER 480 and to generate the output signal. The output signal is passed to PRE-DRIVER 410 along path 403, wherein PRE-DRIVER 410 buffers LOGIC 400 from the large gate capacitance of PMOS TRANSISTOR 420 and NMOS TRANSISTOR 430. The output of PRE-DRIVER 410 is coupled to the gates of PMOS TRANSISTOR 420 and NMOS TRANSISTOR 430 along path 421 and the drain regions of PMOS TRANSISTOR 420 and NMOS TRANSISTOR 430 are coupled at a common node to form OUTPUT 406. The source nodes of PMOS TRANSISTOR 420 and NMOS TRANSISTOR 430 are coupled to SUPPLY 407 and SUPPLY 408 respectively.

Figure 4B:
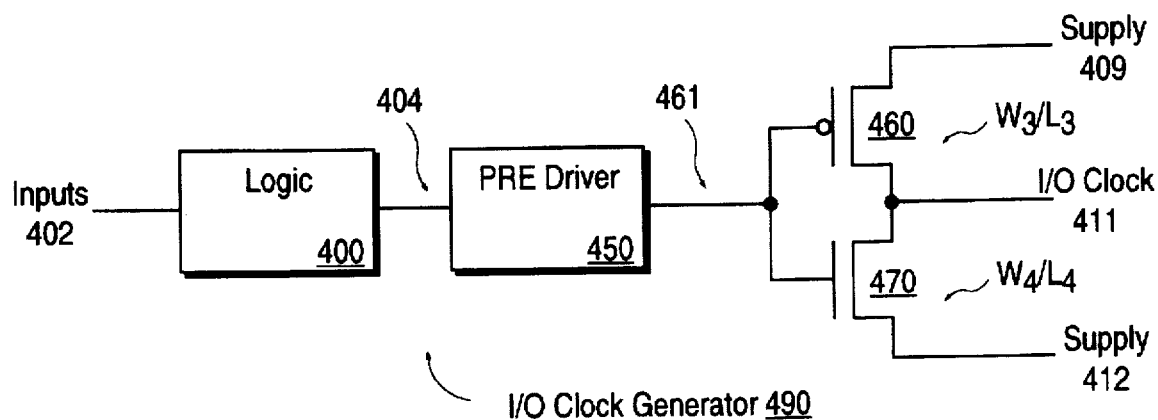
FIG. 4b is an illustration of a I/O clock generator with a pre-driver and a final driving stage.

FIG. 4(b) shows I/O CLOCK GENERATOR 490 according to one embodiment. LOGIC 440 is used to process INPUTS 402 of I/O CLOCK GENERATOR 490 and to generate the output clock signal. The output signal is passed to PRE-DRIVER 450 along path 404, wherein PRE-DRIVER 450 buffers LOGIC 440 from the large gate capacitance of PMOS TRANSISTOR 460 and NMOS TRANSISTOR 470. The output of PRE-DRIVER 450 is coupled to the gates of PMOS TRANSISTOR 460 and NMOS TRANSISTOR 470 along path 461 and the drain regions of PMOS TRANSISTOR 460 and NMOS TRANSISTOR 470 are coupled to form the common node I/O CLK 411. The source nodes of PMOS TRANSISTOR 460 and NMOS TRANSISTOR 470 are coupled to SUPPLY 409 and SUPPLY 412 respectively.

As shown in FIG. 4(a) NMOS TRANSISTOR 430 has a channel length of $L_1$ and a channel width of $W_1$ while PMOS TRANSISTOR 420 has a channel length of $L_2$ and a channel width of $W_2$. Similarly, FIG. 4(b) shows NMOS TRANSISTOR 470 has a channel length of $L_4$ and a channel width of $W_4$ while PMOS TRANSISTOR 460 has a channel length of $L_3$ and a channel width of $W_3$. These sizes are the width as determined by the mask layers. To ensure that OUTPUT 406 is asserted before I/O CLK 411 mask width $L_4$ is sized such that process variations during the fabrication of NMOS TRANSISTOR 470 will not result in an effective channel length wherein the process reduced $L_4$ is smaller than the process reduced $L_2$. $L_3$ mask width is also sized accordingly such that process variations during the fabrication of PMOS TRANSISTOR 460 will not result in an effective channel length wherein the process reduced $L_3$ is smaller than the process reduced $L_1$. To further ensure that OUTPUT 406 is asserted before I/O CLK 411 the mask widths used to define the channel length of the transistors in PRE-DRIVER 450 is increased with respect to the corresponding mask widths used to define the channel length of transistors in PRE-DRIVER 410. However, to insure that the I/O CLK 411 is not delayed significantly the increase in the mask width is typically only one or two of the standard units used to configure the channel length in a given fabrication process. For example, in a process where the channel length is configured using standard units measured as tenths of a micrometer, the relative size increase for the clock generator transistor may be approximately one tenth or two tenths of a micrometer. Constraining the size increase of the clock signal driving transistor ensures that the I/O clock signals used between the driving and receiving component closely follow each other, thus increasing the data transmission frequency.

Figure 5:
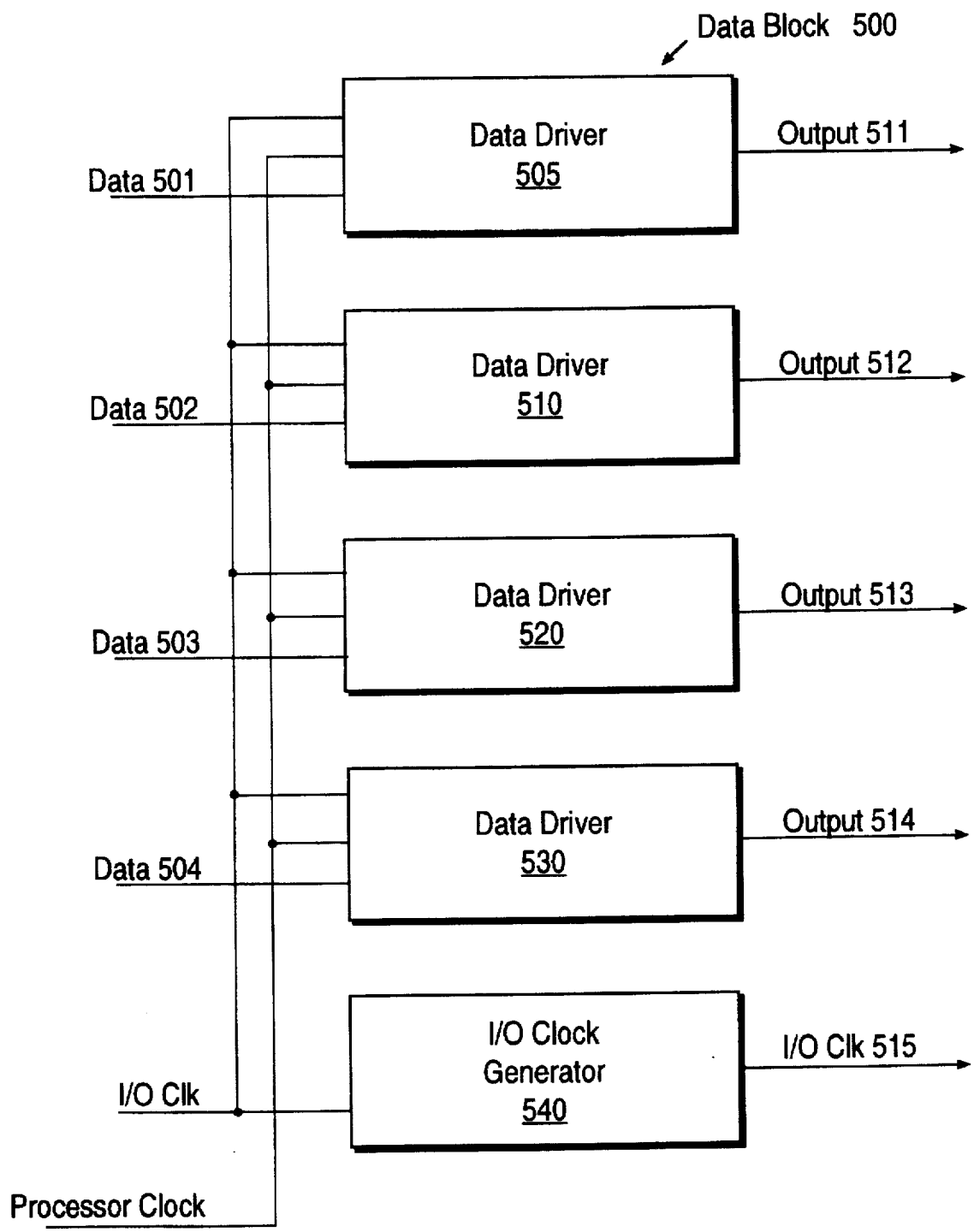
FIG. 5 is an illustration of one embodiment of the present invention wherein a group of data drivers are coupled to an I/O clock generator.

FIG. 5 shows DATA BLOCK 500 according to one embodiment. DATA DRIVERs 505, 510, 520, and 530 are used by DATA BLOCK 500 to generate OUTPUTS 511, 512, 513, and 514. The DATA DRIVERs 505, 510, 520, and 530 comprising ordinary circuits well-known in the art. By coupling DATA DRIVERs 505, 510, 520, and 530 to I/O CLK the outputs signals are generated with respect to the rising or falling edge of the external clocking signal I/O CLK. The DATA DRIVER circuits 505, 510, 520, and 530 are also coupled to PROCESSOR CLOCK and data inputs DATA 501, 502, 503, and 504. Using PROCESSOR CLOCK or I/O CLK, DATA DRIVERs 505, 510, 520, and 530 are able to latch corresponding data inputs DATA 501, 502, 503, and 504. I/O CLOCK GENERATOR 540 is coupled to I/O CLK and is used by DATA BLOCK 500 to generate output I/O CLK 515. As illustrated in FIG. 7(c) I/O CLOCK 3 has a falling edge at point O after the transition of DATA 3 at point N. Similarly, the longer channel length of I/O CLOCK GENERATOR 540's driving transistors (not shown) will add a small delay to the falling edge of I/O CLK 515. This small delay ensures that the I/O CLK 515 signal transitions after OUTPUTS 511, 512, 513, and 514.

Figure 6:
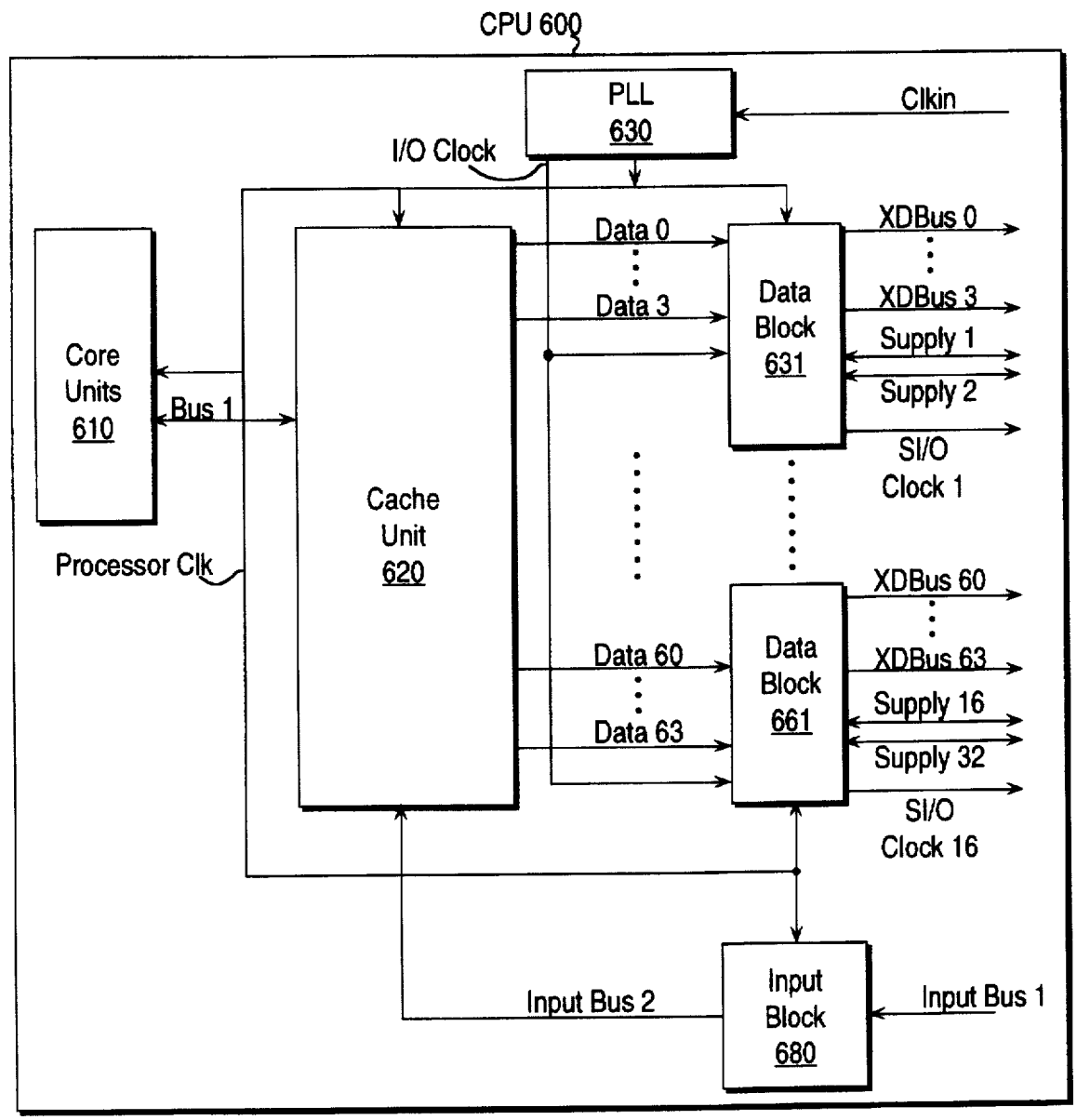
FIG. 6 is an illustration of another embodiment of the present invention wherein a CPU, for use in a source synchronous design utilizing the circuit of FIG. 5, generates output signals and delayed I/O clock signals.

FIG. 6 shows CPU 600 for use in a source synchronous design according to one embodiment. Input CLKIN is a system clock that is used by PLL 630 to generate clock signal I/O CLOCK. I/O CLOCK is coupled to the array of DATA BLOCKs 631-661 and is used by the DATA BLOCKs to synchronize the driving of data outputs XDBUS 0 through XDBUS 63. The DATA BLOCKs also generate outputs SI/O CLOCK 1 through SI/O CLOCK 16. Each SI/O CLOCK signal is associated with a group of data outputs. For example SI/O CLOCK 1 is generated from the same DATA BLOCK 631 that generates data outputs XDBUS 0, 1, 2, and 3. Thus, the external receiving component (not shown) that latches outputs XDBUS 0, 1, 2, and 3 would utilize SI/O CLOCK 1 as synchronizing signal to latch outputs XDBUS 0, 1, 2, and 3. PROCESSOR CLK is also coupled to INPUT BLOCK 680 and CACHE UNIT 320. INPUT BLOCK 680 passes signals from external inputs INPUTBUS 1 to CACHE UNIT 620 through INPUTBUS 2. CACHE UNIT 620 can process the signals from INPUTBUS 2 or pass the data to CORE UNITS 610 along BUS 1.

PLL 630 also generates PROCESSOR CLK is coupled to CORE UNITS 610, CACHE UNIT 620, DATA BLOCKs 631-661, and INPUT BLOCK 680. CORE UNITS 610 use PROCESSOR CLK to synchronize signal transfers internally and along BUS 1 to CACHE UNIT 620. Data transferred along BUS 1 to CACHE UNIT 620 can be passed to DATA BLOCKs 631-661 through data lines DATA 0 through DATA 63 directly. This indirect data transfer between CORE UNITS 610 and DATA BLOCKs 631-661 allows CPU 600 to operate PROCESSOR CLK at a different frequency than I/O CLOCK because CORE UNITS 610 and CACHE UNIT 620 do not have to generate output signals XDBUS 0-63 directly.

What is claimed is:

1. An integrated circuit comprising:
   a clock generator for generating a core clock signal and an input/output I/O clock signal;
   a plurality of functional units, said plurality of functional units including a cache, wherein said cache is coupled to a core unit, said core clock signal, and an I/O unit;
   a plurality of data blocks coupled to said core clock signal and said I/O clock signal, each of said data blocks comprising:
   a plurality of data bus drivers for receiving data from said functional units and outputting external data, each of said data bus drivers including:
      a data input coupled to said cache; a data output synchronized via said I/O clock signal; and a data drive circuit comprising a plurality of transistors for driving said data output;
      an output clock generator coupled to said I/O clock signal, said output clock generator including a clock drive circuit for outputting an output clock signal via a clock output, wherein said clock drive circuit is substantially identical to said data drive circuit and said clock drive circuit comprises a plurality of transistors, each of said plurality of transistors of said clock drive circuit having a slightly longer channel length than a corresponding transistor in said data drive circuit.

2. A source synchronous computer system for reducing wait states and delays comprising:
   a first and a second component, said first component coupled to said second component, wherein said first component generates data that is synchronously captured by said second component, said first component comprising:
   a system clock input;
   a first circuit coupled to said system clock input, wherein said first circuit generates a first clock signal and a second clock signal, said first clock signal for synchronizing external data signals transmissions, said second clock signal for synchronizing internal data signals transmissions;
   a second circuit coupled to said first clock signal, said second clock signal, and having a plurality of input nodes, wherein said second circuit receives data signals via said input nodes and generates said internal data signals;
   a plurality of m data driver circuits, wherein each of said m data driver circuits generate said external data signals of said first component synchronized to said first clock signal, wherein each of said m data driver circuits is coupled to said second circuit to receive said internal data signals via a first data inputs and data output nodes for outputting said external data signals;
   a plurality of n clock driver circuits for generating n external clock signals, wherein each of said n clock driver circuits is substantially identical to said m data driver circuits, said n clock driver circuits comprising a plurality of transistors, each of said plurality of transistors of said n clock driver circuits having a slightly longer channel length than a corresponding transistor in said m data driver circuits, and wherein each of said n clock driver circuits are coupled to said first clock signal and a clock output node for outputting one of said n external clock signals;
   an external output bus coupled to said data output nodes of said m data driver circuits; and
   said second component comprising:
   a plurality of m receiving circuits each for synchronously capturing said external data signals from their associated plurality of m data driver circuits of said first component off said external output bus, wherein each of said m receiving circuits is coupled to said external output bus via a plurality of external data inputs, said m receiving circuits coupled to their associated clock output node of said first component, wherein said external data signals are latched by said m receiving circuits using said one of external clock signal associated with each of said external data signals.

3. The source synchronous computer system of claim 2 wherein said m data driver circuits of said first component are divided into l sets of output data signals, each set comprising:
   m/l data driver circuit sets;
   each of said m/l driver circuit sets including a plurality of first transistors coupled to said data output node; and
   each one of said n clock driver circuits associated with said m/l data driver circuit sets including a plurality of second transistors coupled to said clock output node, wherein each of said plurality of second transistors has a longer channel length than a corresponding transistor of said plurality of first transistors, and wherein each of said set of output data signals is synchronously captured by said second component using said external clock signal associated with each of said set of output data signals.

4. An integrated circuit having a plurality of functional units and a clock generator for generating a core clock signal and an input/output I/O clock signal, said plurality of functional units including a cache unit, and an I/O unit, said I/O unit comprising:
   a plurality of data blocks coupled to said core clock signal and said I/O clock signal, each of said plurality of data blocks comprising:
      a plurality of data bus drivers for receiving data from said cache unit and outputting said data, wherein said outputting of said data is external to said integrated circuit, each of said data bus drivers including:
      a first input coupled to said cache unit; a first output synchronized via said I/O clock signal; and a first drive circuit comprising a plurality of transistors for driving said first output;
      a first clock generator coupled to said I/O clock signal wherein said first clock generator is substantially identical to the data bus driver, the first clock generator including a second drive circuit for outputting a first clock signal via a first external clock output.

5. A method for ensuring that process variations do not result in clock signal changing prior to data transitions in a source synchronous design, wherein said clock signal are used to synchronize data signal transmission between a plurality of components, said method comprising:
   (a) generating said clock signal;
   (b) transmitting said data signals from a first component to a datablock component synchronous with said clock signal via an input dataline;
   (c) transmitting said clock signal to said datablock component;
   (d) creating an output data signal;
   (e) creating an output clock signal;
   (f) transmitting said output data signal from said datablock component using a data driver having a plurality of first transistors to a second component;

(g) transmitting said output clock signal from said datablock component to said second component using a clock driver having a plurality of second transistors to a second component, wherein said data driver is substantially identical to said clock driver except for longer channel lengths of said second transistors; and (h) synchronously capturing said data signals in said second component with said output clock signal associated with said output data signals.

6. An integrated circuit for use in a source synchronous design comprising:

a data driver, said data driver having an input data node and an output data node;

an I/O clock generator, said I/O clock generator having clock input node and an clock output node;

said I/O clock generator and said data driver each include a plurality of transistors, wherein said transistors of said I/O clock generator have longer channel lengths than said corresponding transistors of said data driver, such that an output data signal from said output data node transitions prior to an output clock signal from said clock output node, and such that when said output data signal is captured by an external component synchronously using said output clock signal said output data signal is valid.

* * * * *